(12) United States Patent
Church et al.

(10) Patent No.: US 12,553,018 B2
(45) Date of Patent: Feb. 17, 2026

(54) CONTINUOUSLY EXPANDING VOLUME BIOREACTOR

(71) Applicant: Sciperio, Inc, Orlando, FL (US)

(72) Inventors: Kenneth H. Church, Orlando, FL (US); Casey W. Perkowski, Winter Park, FL (US); Pierce J. Busse, Pensacola, FL (US); Paul I. Deffenbaugh, Orlando, FL (US); Michael W. Owens, Orlando, FL (US); Janice M. Moser, Oviedo, FL (US)

(73) Assignee: SCIPERIO, INC, Orlando, FL (US)

( * ) Notice: Subject to any disclaimer, the term of this patent is extended or adjusted under 35 U.S.C. 154(b) by 835 days.

(21) Appl. No.: 17/541,436

(22) Filed: Dec. 3, 2021

(65) Prior Publication Data

US 2022/0177822 A1    Jun. 9, 2022

Related U.S. Application Data

(60) Provisional application No. 63/121,639, filed on Dec. 4, 2020.

(51) Int. Cl.
*C12M 3/00* (2006.01)
*C12M 1/00* (2006.01)
(Continued)

(52) U.S. Cl.
CPC ............ *C12M 23/44* (2013.01); *C12M 23/06* (2013.01); *C12M 23/22* (2013.01); *C12M 27/02* (2013.01); *C12M 41/26* (2013.01); *C12M 41/34* (2013.01)

(58) Field of Classification Search
CPC ...... C12M 23/44; C12M 23/06; C12M 23/22; C12M 27/02; C12M 41/26; C12M 41/34
See application file for complete search history.

(56) References Cited

U.S. PATENT DOCUMENTS

| 4,649,117 A | 3/1987 | Familletti |
| 4,833,083 A | 5/1989 | Saxena |

(Continued)

FOREIGN PATENT DOCUMENTS

| EP | 0353893 A3 | 3/1990 |
| EP | 3167042 B1 | 12/2019 |

(Continued)

OTHER PUBLICATIONS

International Search Report and Written Opinion, PCT/US2021/061711, Mar. 1, 2022, 12 Pages.

(Continued)

*Primary Examiner* — Michael A Marcheschi
*Assistant Examiner* — Ashley Lopezlira
(74) *Attorney, Agent, or Firm* — Goodhue, Coleman & Owens, P.C.

(57) ABSTRACT

A bioreactor system having an expanding volume is provided. The system includes a bioreactor assembly comprising a plurality of bioreactors including at least a first bioreactor and a second bioreactor proximate the first bioreactor. The bioreactor system further includes a first gate between the first bioreactor and the second bioreactor such in a first configuration the gate is closed and the first bioreactor is isolated from the second bioreactor and in a second configuration the gate is open and the first bioreactor is contiguous with the second bioreactor and media and cells form a homogenous mixture within a combined volume formed by the first bioreactor in combination with the second bioreactor. The bioreactor system may further include a microdispenser for each of the plurality of bioreactors for controlling dispensement of media into each of the plurality of bioreactors.

14 Claims, 7 Drawing Sheets

(51) Int. Cl.
    *C12M 1/06*     (2006.01)
    *C12M 1/12*     (2006.01)
    *C12M 1/34*     (2006.01)

(56) References Cited

U.S. PATENT DOCUMENTS

| | | | |
|---|---|---|---|
| 4,939,087 A | 7/1990 | Wie et al. | |
| 4,966,207 A * | 10/1990 | Howard | B65D 85/84 |
| | | | 206/524.5 |
| 5,081,035 A | 1/1992 | Halberstadt et al. | |
| 5,081,036 A | 1/1992 | Familletti | |
| 5,443,985 A | 8/1995 | Lu et al. | |
| 5,622,857 A | 4/1997 | Goffe | |
| 6,001,642 A | 12/1999 | Tsao | |
| 7,348,175 B2 | 3/2008 | Vilendrer et al. | |
| 8,492,140 B2 | 7/2013 | Smith et al. | |
| 9,765,363 B1 * | 9/2017 | Renninger | C12M 41/18 |
| 2004/0203140 A1 * | 10/2004 | Akers | C12M 23/14 |
| | | | 435/297.2 |
| 2006/0199260 A1 | 9/2006 | Zhang et al. | |
| 2010/0167388 A1 | 7/2010 | Kessler | |
| 2013/0288344 A1 * | 10/2013 | Bargh | C12M 41/22 |
| | | | 435/286.1 |
| 2016/0040110 A1 | 2/2016 | Khan | |
| 2018/0298319 A1 | 10/2018 | Wikswo | |
| 2020/0190457 A1 * | 6/2020 | Veraitch | C12M 23/26 |
| 2020/0283713 A1 * | 9/2020 | Ball | C12M 41/48 |
| 2020/0319217 A1 * | 10/2020 | Verhoef | H04N 7/183 |

FOREIGN PATENT DOCUMENTS

| | | |
|---|---|---|
| RU | 117916 U1 | 7/2012 |
| WO | 2007044699 A1 | 4/2007 |
| WO | 2011090781 A1 | 7/2011 |

OTHER PUBLICATIONS

European Patent Office, extended European search report, 21901494.1, Jul. 30, 2025, 13 pages.

* cited by examiner

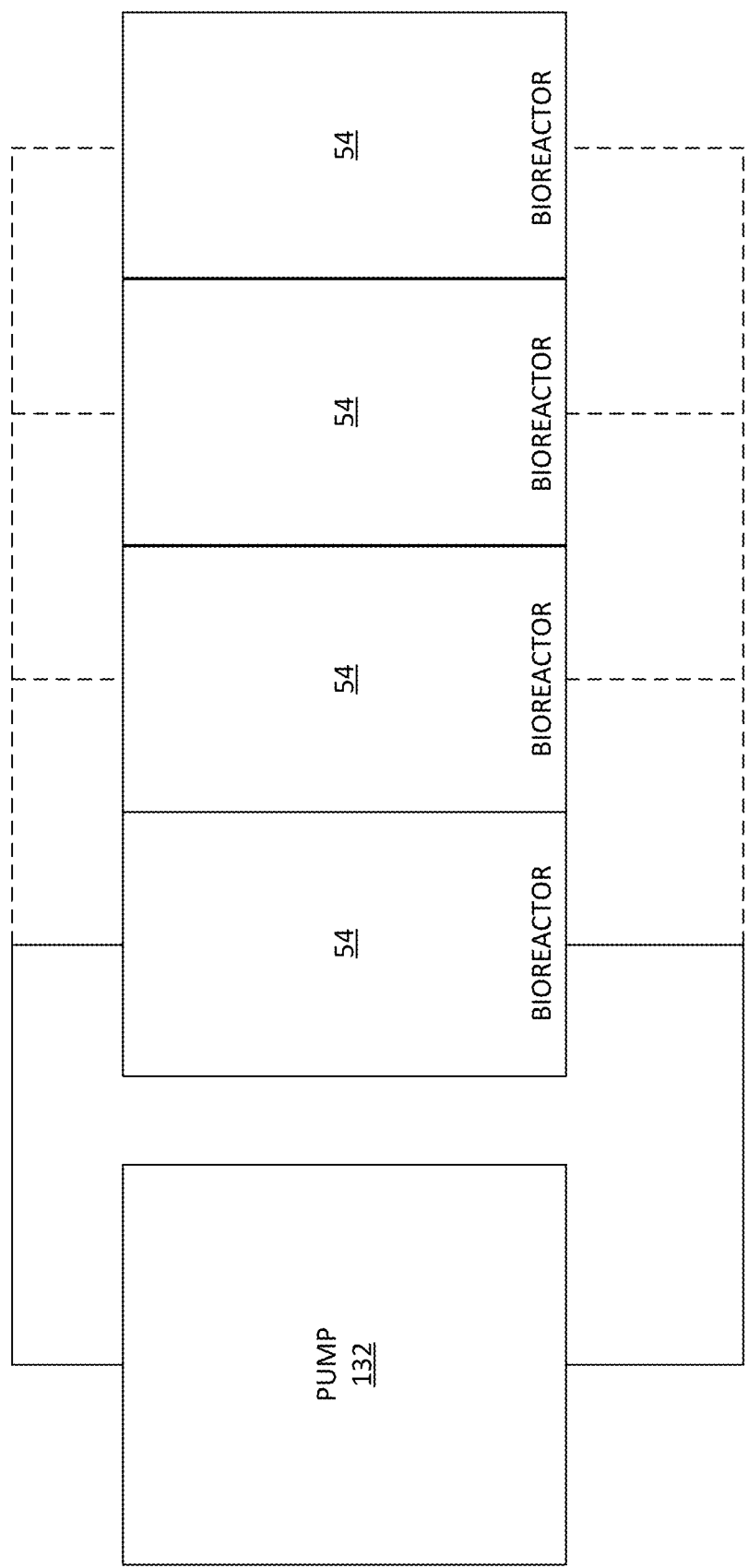

CONTINUOUSLY EXPANDING VOLUME BIOREACTOR

RELATED APPLICATIONS

This application claims priority to U.S. Provisional Patent Application No. 63/121,639, filed Dec. 4, 2020, hereby incorporated by reference in its entirety.

GRANT REFERENCE

This invention was made with government support under Contract No. HU0001-20-2-0011 awarded by the Department of Defense, an agency of the U.S. Government. The government has certain rights in the invention.

FIELD OF THE INVENTION

The present invention is in the field of cell bioreactors. More particularly, but not exclusively, the present invention relates to providing the ideal space for culture of cells such as red blood cells though careful volume control.

BACKGROUND

The background is discussed with respect to problems related to production of red blood cells for blood transfusion. However, it is to be understood that the present invention need not be limited to this specific application. Blood transfusions are a common medical practice, but the method of obtaining blood for patients has previously required several donors and presents many safety and logistical considerations. The production of red blood cells from hematopoietic stem cells has been researched at length. It has been found that manufacturing red blood cells ex vivo from various types of progenitor cells is feasible and has been widely reported in literature. However, the difficulty in this process is scalability since high numbers of transfusable red blood cells, approximately 2E12 cells/unit of transfusable red cells, are required. Typical cell culture methods to produce this number of cells requires a large volume of cell culture media and therefore a large culture station footprint. Large volumes are problematic; whilst cost of medium components can be driven down to make volume cost effective, there are logistical, system, and infrastructure costs associated with high volume manufacture systems.

SUMMARY

Therefore, it is a primary object, feature, or advantage of the present invention to improve over the state of the art.

It is a further object, feature, or advantage of the present invention to provide a bioreactor which is expandable in nature as a bioreaction process progresses such as while cell culturing progresses.

It is a still further object, feature, or advantage of the present invention to provide for monitoring of factors affecting the bioreaction process.

Another object, feature, or advantage is to provide a bioreactor which allows small volumes to be independently monitored and controlled but combined with additional small volumes as needed to produce higher volume throughput.

Yet another object, feature, or advantage is to provide a bioreactor which includes a re-circulating loop.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, the present invention expands on the general capabilities of a bioreactor to include specifications for cell culturing. In order to produce red blood cells, neutrophils, platelets or any biological cell, several factors have to be monitored and controlled to a high degree. Cell density is restricted due to optimal media use, $CO_2$, and waste removal. Cell viability in the growth phase is affected by a number of factors including pH balance, $O_2$ supply, temperature, osmolarity, gas exchange surface area, and amino acid supply. The entire system needs to be homogeneous. Adjustments to a large volume take time, and part of the volume can experience highs or lows for periods of time. These factors have to be monitored and maintained with feedback. Cell viability and uninhibited cell growth rate can be improved by real time sensing and controlling in small volumes. For higher volume throughput of cell culturing, the small volumes can be broken up into voxels that are continuous. The specific cell utilization rate and independent time decay rate were calculated to design a concentrated feed to these voxels that can maintain growth without requiring proportional increase in volume. This allows the cells to be in stable and optimal environments and also to communicate from cell to cell.

According to another aspect, a bioreactor system having an expanding volume is provided. The system includes a bioreactor assembly comprising a plurality of bioreactors including at least a first bioreactor and a second bioreactor proximate the first bioreactor. The bioreactor system further includes a first gate between the first bioreactor and the second bioreactor such in a first configuration the gate is closed and the first bioreactor is isolated from the second bioreactor and in a second configuration the gate is open and the first bioreactor is contiguous with the second bioreactor and media and cells form a homogenous mixture within a combined volume formed by the first bioreactor in combination with the second bioreactor. The bioreactor system may further include a microdispenser for each of the plurality of bioreactors for controlling dispensement of media into each of the plurality of bioreactors. The plurality of bioreactors may further include a third bioreactor proximate the second bioreactor and a second gate between the second bioreactor and the third bioreactor. The system may include a pH sensor for each of the plurality of bioreactors positioned to detect pH of fluid. The system may include at least one gas sensor for each of the plurality of bioreactors positioned to detect gas level within a corresponding one of the plurality of bioreactors. The gas sensor may be a dissolved oxygen sensor. The bioreactor system may further include at least one camera or other light source and detector configured for cell observation. The at least one camera or other light source and detector may be configured for cell counting, the at least one camera or other light source and detector may be configured to observe changes within the media. The bioreactor system may further include a control system each of the plurality of bioreactors within the bioreactor system. The control system may provide provides real-time feedback from a plurality of sensor inputs for each of the plurality of bioreactors and provides for actuation of one or more actuators. Each of the plurality of bioreactors may include an agitator such as a stirring rod. Each of the plurality of bioreactors may include one or more permeable membranes. A centrifuge may operatively connected to at least one of the plurality of bioreactors. A pump may be operatively connected to at least one of the plurality of bioreactors to provide for circulating or re-circulating fluid.

BRIEF DESCRIPTION OF THE DRAWINGS

Illustrated embodiments of the disclosure are described in detail below with reference to the attached drawing figures, which are incorporated by reference herein.

FIG. 7 is a block diagram illustrating a pump and fluidly connected voxels or bioreactors.

DETAILED DESCRIPTION

A bioreactor with a continuously expanding volume, feedback controls, and sensors for the consistent production of biological cells is needed for high cell viability, optimal cell density and high cell count throughput. The bioreactor has a small volume that is sensor and actuator controlled for maintaining temperature, pH, oxygen, $CO_2$, and media concentration. As cells double and expand, the volume needs to expand to handle an increased number of cells. A second volume filled with media and proper bio conditions is joined to the first and the second has identical but separate sensor and actuation controls for optimized cell expansion conditions. As cells continue to expand and use up more volume, more volume or voxels are made accessible. The voxels are connected and continuous and each voxel maintains its own sensor and actuation controls. The entire system is controlled using a microcontroller with expandable input/output ports for parallel data collection and signal transfer. The reactor may autonomously control the feed, pH, oxygen, and $CO_2$ necessary for cell production. Permeable membranes may be used to allow for gas transfer without sparging, and a pump may be used to circulate the cells without damaging them. A microfluidic/continuous centrifuge may be used to separate the media and the cells to remove toxins. In situ flow cytometry may be used to allow for the determination of cell density and cell viability.

Figure 1:
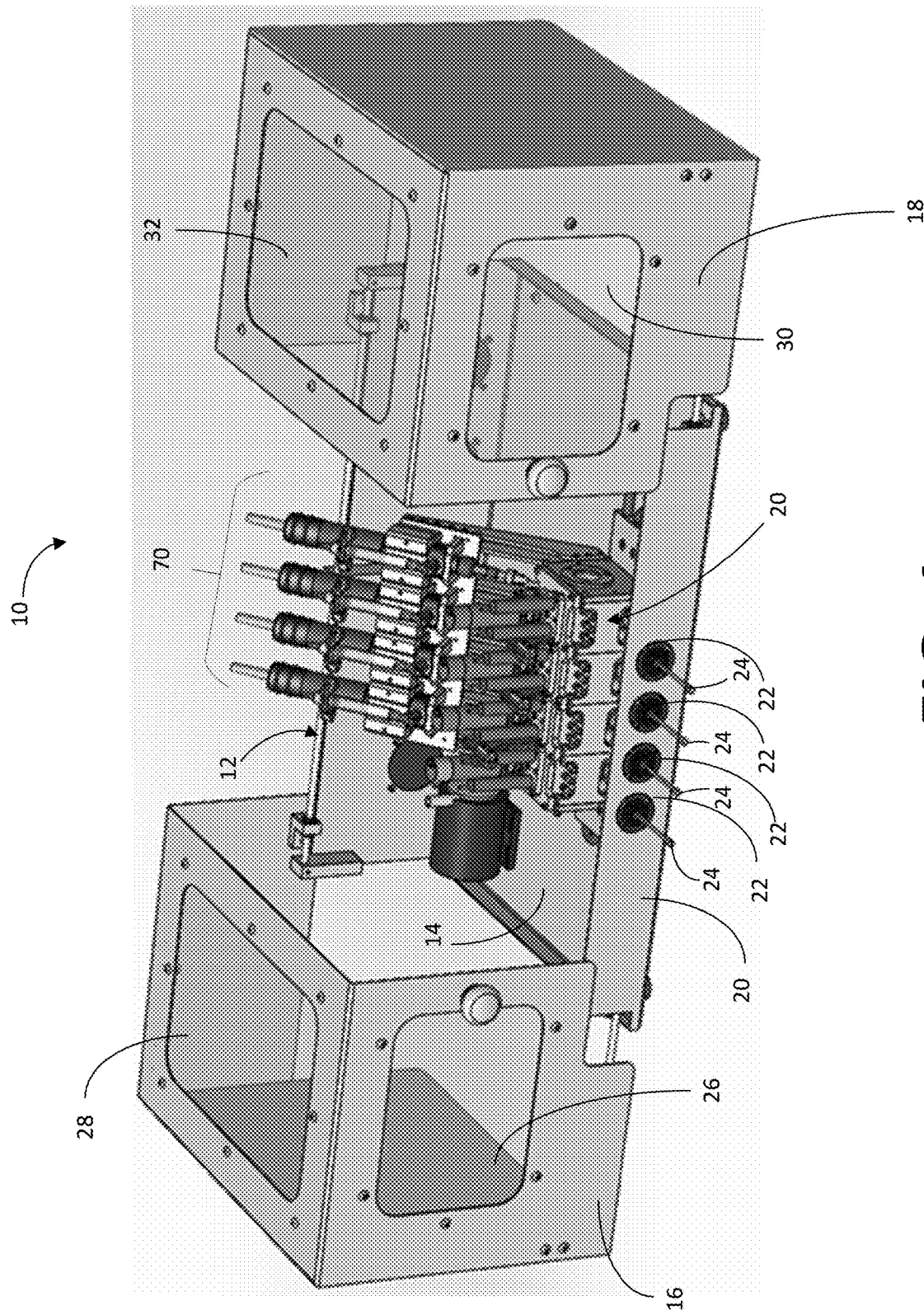
FIG. 1 is a perspective view of one embodiment of a bioreactor system.
Figure 2:
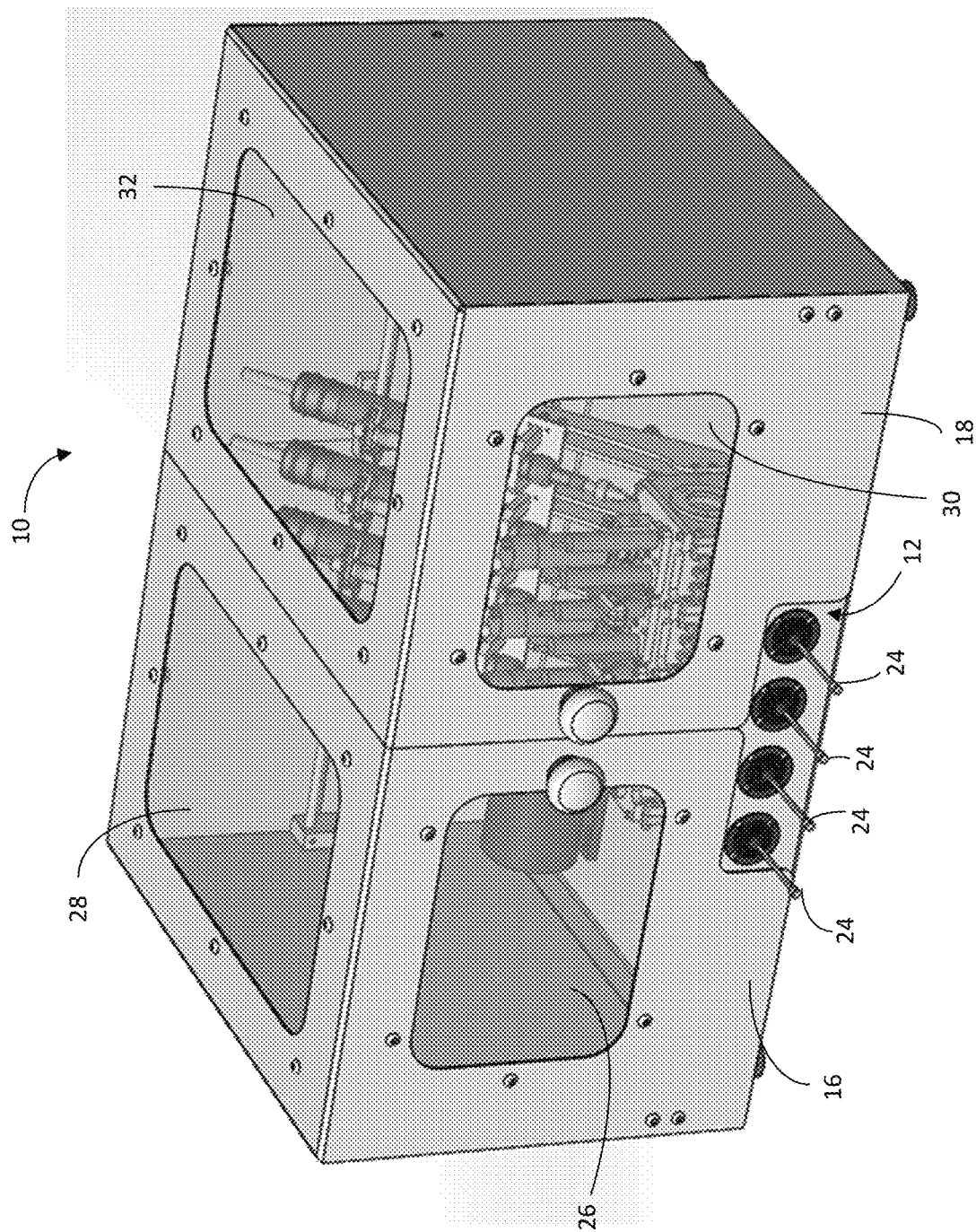
FIG. 2 is another perspective view of the bioreactor system.

FIG. 1 is a perspective view of one embodiment of a bioreactor system 10. The bioreactor system 10 has a housing 12 which may be formed of stainless steel or other appropriate material. The housing may have a base 14 and opposite sliding doors 16, 18 which may be operatively connected to the base 14 to allow the housing 12 of the bioreactor system 10 to be opened or closed. A bioreactor assembly 20 is positioned within the housing 12. At the front of the base 14 are self-sealing ports 22 and sensor probes 24 extending outwardly. The self-sealing ports 22 may be used to circulate fluid such as to a centrifuge or to microfluidic channels. Note that access to the self-sealing ports 22 and the sensor probes 24 is available even when the housing 12 is in a closed position. The sliding doors 16, 18 may include glass portions or otherwise transparent portions 26, 28, 30, 32 to allow for viewing of the bioreactor assembly 20 when the housing 12 is sealed closed. FIG. 2 illustrate the bioreactor system 10 when the doors 16, 18 are closed.

Figure 3:
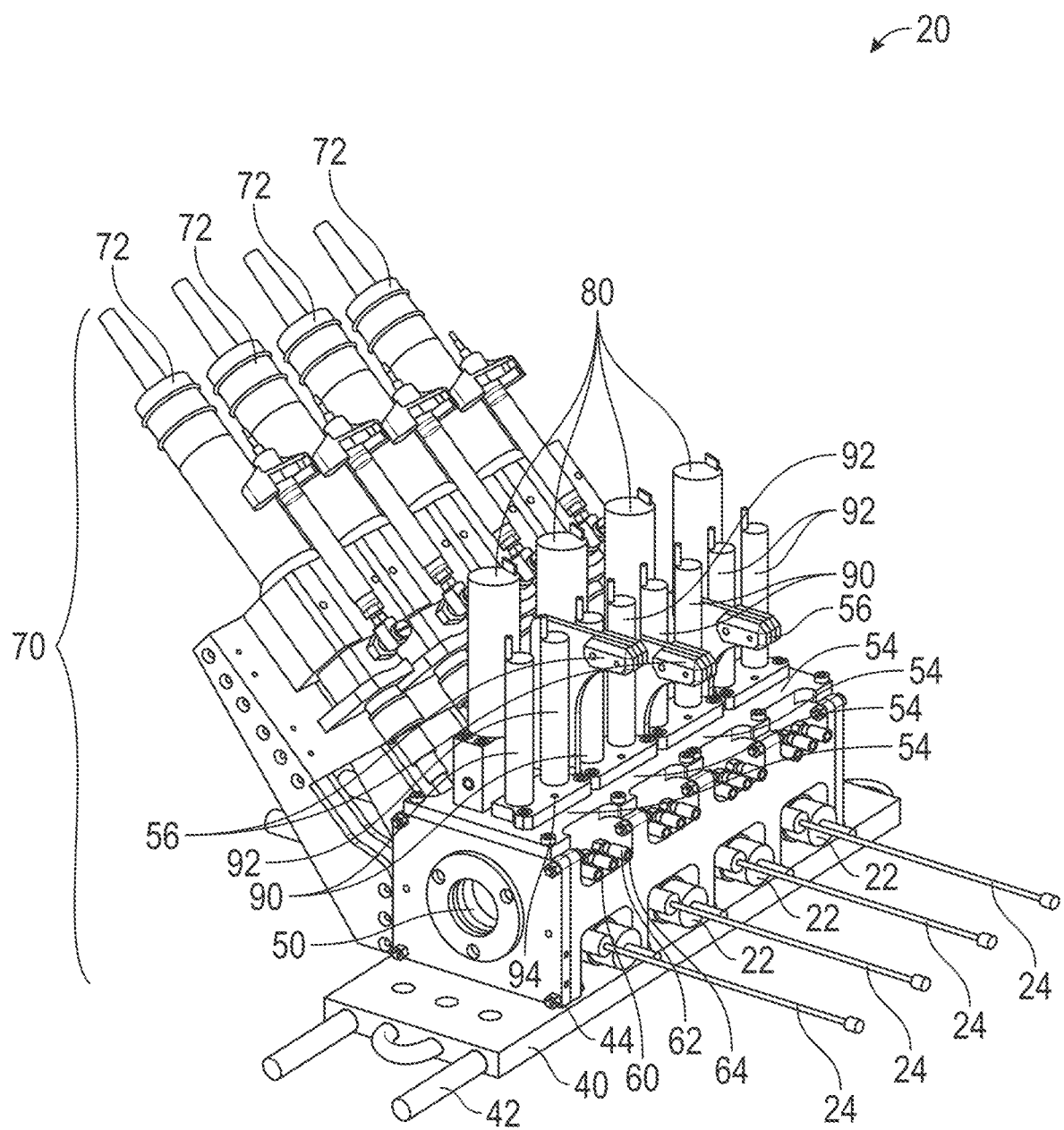
FIG. 3 is a view of a bioreactor assembly.

FIG. 3 is another perspective view of the bioreactor assembly 20. The bioreactor assembly 20 includes a warming plate 40. Coils 42 may run through the warming plate 40 to provide for electrical heating. A reactor tank assembly 44 is positioned on or in contact with the warming plate 40. As shown, the reactor tank assembly 44 includes four voxels 54. More or fewer voxels may be used. Each voxel may function as a mini bio-reactor. The reactor tank assembly 44 includes partitions 56 which may set in place to separate the voxels or may be removed to join adjacent, neighboring, or otherwise proximate voxels to thereby allow for the volume to be expanded as needed. As shown, the leftmost partition 56 is in a raised partition so that the leftmost voxels 54 are joined and the remaining partitions 56 are in a lowered partition so that the remaining voxels 54 are separated from neighboring voxels from one another. Although shown in a single linear array of voxels, it is to be understood that the present invention contemplates other configurations of voxels such as, but not limited to, voxels arranged in multiple dimensions.

The bioreactor assembly 20 includes a microdispenser assembly 70. The microdispenser assembly includes a microdispenser 72 for each corresponding one of the voxels 54. In operation, actuators of the microdispensers 72 may be used to precisely control dispensement of media into the corresponding voxel 54.

Each of the voxels 54 may have an actuator such as a motor or other actuator 80 for agitating or stirring the contents of the corresponding bio-chamber. Each actuator 80 may impart motion to a stirring rod or other type of agitator that assists in stirring or agitating the material but without imparting shear stress at a level which would damage cells where the bioreactor is used for cell culturing. Any number of different types of stirring rods or agitators may be used. The size and shape of each of the stirring rods may be optimized such as through use of computational fluid dynamics (CFD) in order to promote mixing and provide the least amount of shear in order to facilitate the appropriate reactions while avoiding or minimizing damage to cells.

Each of the voxels 54 has a set of probes 90, 92. The probes may include pH probes 90, and cell viability or cell density probes 92.

Access ports 94 are positioned near the pH probes 90 and the cell viability probes 92. The access ports 94 allow for pipetting and/or putting in and/or taking out or sampling cells. The access ports 94 may be sealed off such as with thumbscrews or otherwise.

Extending from each of the voxels is a sensor 24 such as a dissolved oxygen sensor. On the opposite side of each of the voxels a resistance temperature detector (RTD) thermocouple or other temperature sensor may be present. Each of the voxels 54 has its own set of inputs, outputs, and sensor ports. The present invention contemplates any type of sensor may be used as may be appropriate for collecting data regarding the reactions occurring within each voxel. This may include sensors for measuring pH, alkalinity, or acidity. This may include sensors for measuring gas levels such as oxygen levels or carbon dioxide levels or nitrogen levels. This may further include any number of optical systems including light sources and detectors such as cameras positioned for monitoring the reactions. For example, the cameras may include high mag cameras for cell observation, fast or streak cameras for cell counting, or cameras which allow for observation of changes in the media. Other types of light sources and detectors may be used.

Each of the voxels 54 has its own set of gas ports 60, 62, 64 such as oxygen ports, carbon dioxide ports, and nitrogen ports. Permeable membranes may be used in the voxels to allow for gas transfer without sparging.

Each of the voxels 54 may have a port 22 that may be used as a part of a recirculation loop. A similar port may be present on an opposite of the voxel 54. These ports may serve as inlets and outlets for the recirculation loop. These ports may be self-sealing so that one does not need to use them unless desired. Connections with these ports may be moved to include an additional reactor within the recirculation loop as the additional bioreactors are brought online. In some embodiments, a centrifuge may be used to separate the media and the cells to remove toxins. In other embodiments, cells may be separated and isolated through use of microfluidic channels.

In addition, the media may be recirculated. For example, after the media has been used and the cells derive little or no value from the media, the media may be filtered out as fresh media is being added. The old media may be conveyed to a reverse osmosis (RO) or other type of purification system to remove the water for reuse. The residual may be collected and separated and recycled for additional use.

The reactor tank assembly 44 has a window or viewing port 50. This may be used to visually observe the reaction. In some embodiments, cameras may be placed at the viewing port 50 or may be positioned elsewhere in order to capture imagery of the reactions. The imagery may be processed further as needed.

Figure 4:
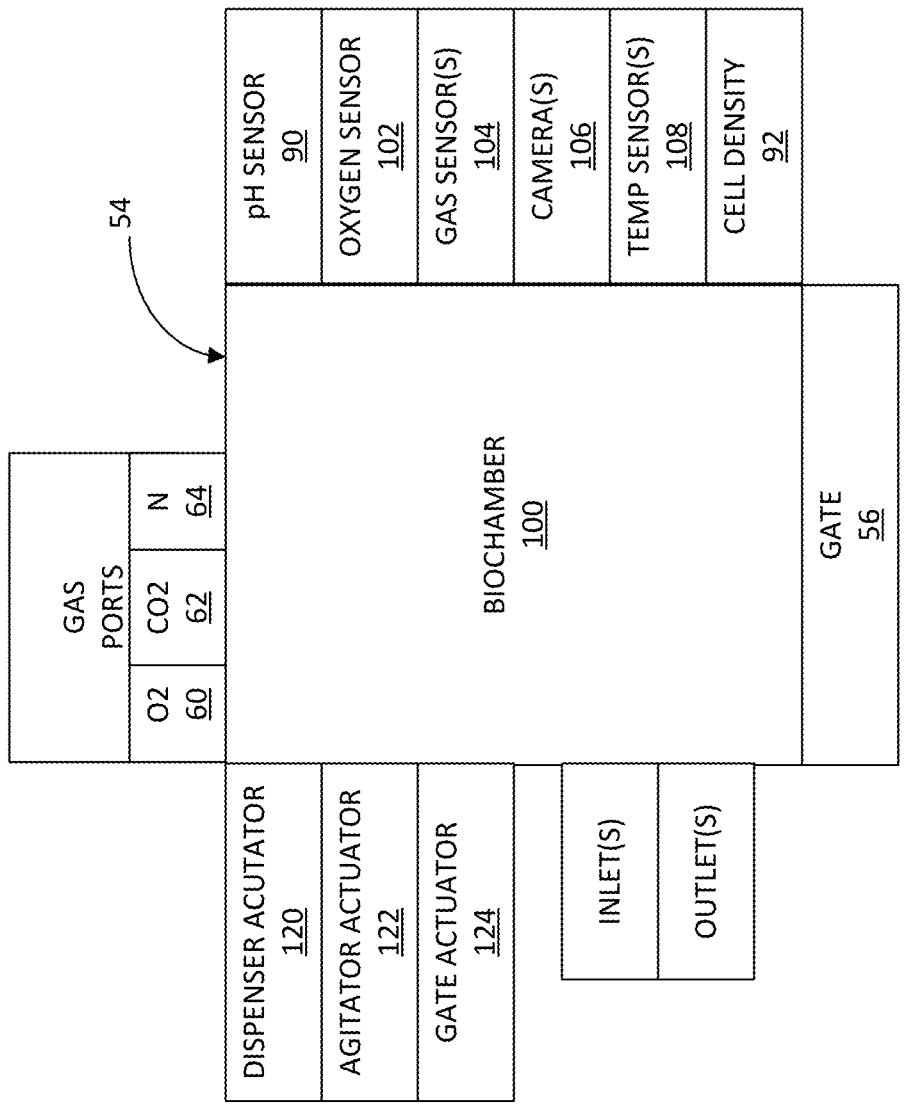
FIG. 4 is a block diagram of a bioreactor or voxel.

FIG. 4 is a block diagram of one example of a bioreactor 54 or voxel which makes up a part of an assembly. Note that the bioreactor includes a biochamber 100 in which media is present and cells are cultured. Various sensors may be used to monitor the reactions within the biochamber 100. These include a PH Sensor 90, an oxygen sensor 102, other gas sensors 104, one or more cameras 106, one or more temperature sensors 108, one or more cell density sensors 92 or other types of sensors. Input from the sensors may be used to assist in controlling the reactions. This may involve introducing additional gases into the chamber through the gas ports, such oxygen through an oxygen port 60, carbon dioxide through a carbon dioxide port 62, and/or nitrogen through a nitrogen port 64. Of course, other gases may be introduced as may be appropriate for a particular type of reaction. The control system may be used to control a number of different actuators associated with the bioreactor. For example, a dispenser actuator 120 may associated with the bioreactor for precisely dispensing medium into the bioreactor 54. An agitator actuator 122 may be associated with the bioreactor. For example, the agitator actuator 122 may be a motor for a stirring rod which is present within the biochamber to agitate or stir the mixture of media and cells. A gate actuator 124 may be present for opening or closing a gate 56 between adjacent or proximate bioreactors or voxels. In addition, various other inlets and outlets may be present for accessing the biochamber such as to add or remove fluid, circulate fluid, or for other purposes.

Figure 5:
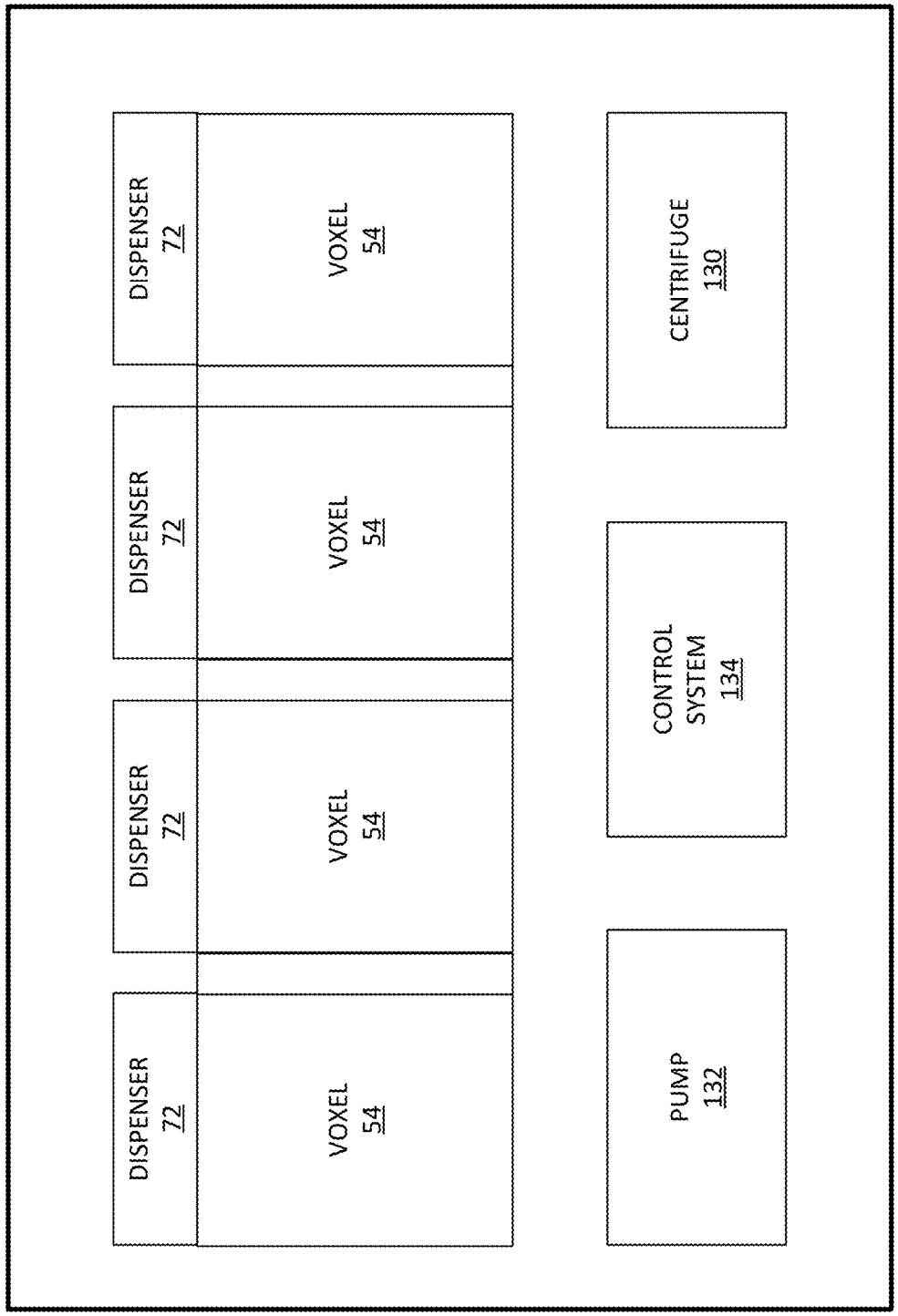
FIG. 5 is a block diagram of a bioreactor system.

FIG. 5 is a block diagram showing a configuration for an assembly having a plurality of voxels or bioreactors 54. As shown in FIG. 5, four different bioreactors or voxels 54 are present. A dispenser 72 is shown for each of the different bioreactors 54 which is used to precisely dispense medium. A centrifuge 130 is also shown which may be fluidly connected to one or more of the bioreactors 54. In some embodiments, fluid from the bioreactors may be conveyed to the centrifuge 130 where the media and the cells may be separated and toxins may be removed. A pump 132 is also shown which may be fluidly connected to one or more of the bioreactors for moving fluid through the system. A control system 134 is also shown which may include a processor or other type of intelligent control and may rely upon sensor readings from the various sensors previously discussed to control various actuators within the system to control the process.

Figure 6:
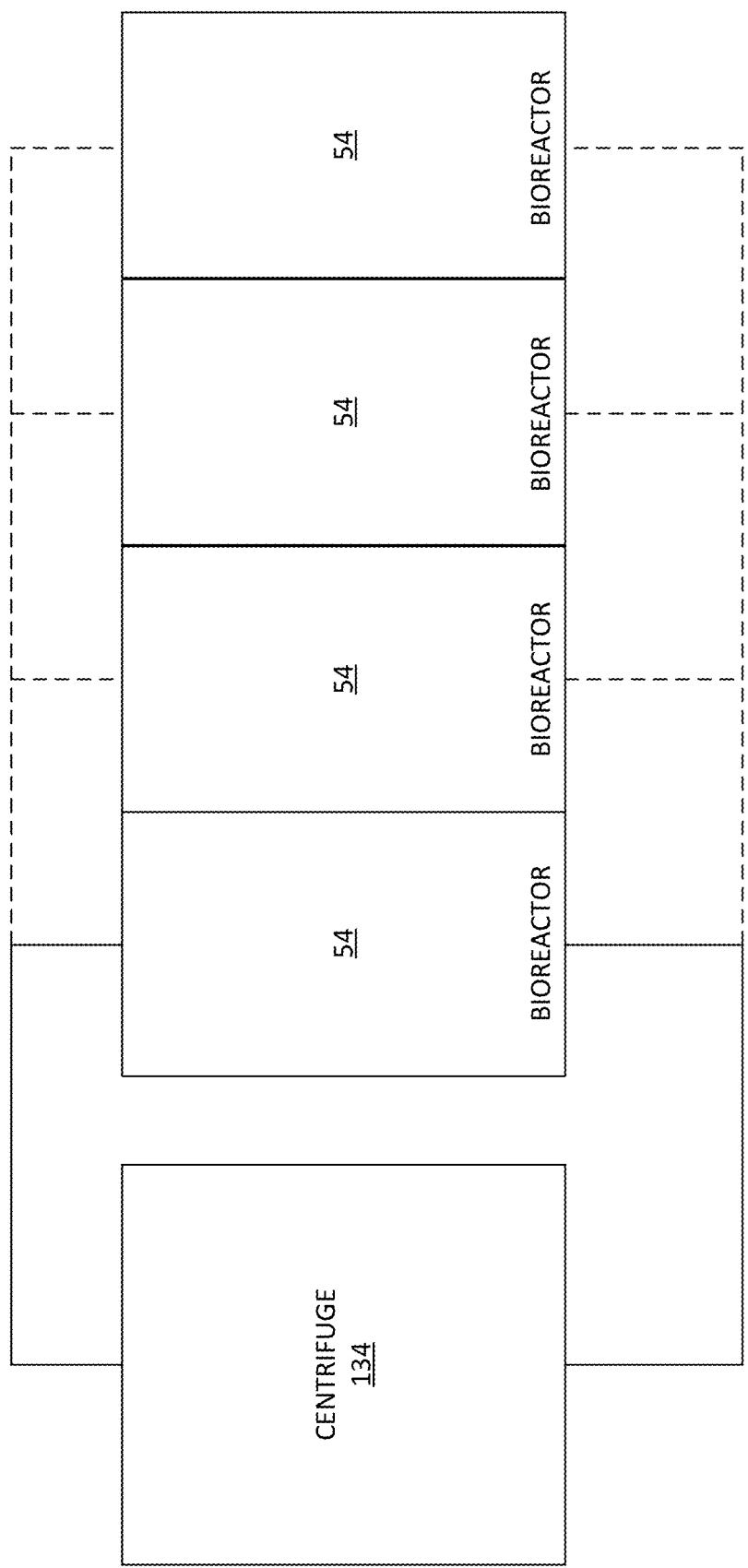
FIG. 6 is a block diagram illustrating a centrifuge and fluidly connected voxels or bioreactors.

FIG. 6 illustrates the centrifuge or other microfluidic device 134 fluidly connected to one or more of the bioreactors 54. Thus, for example, fluid containing media and cells may be removed from a bioreactor and then returned to the bioreactor after processing by the centrifuge 134. A pump may be used to circulate the fluid media to the centrifuge. The centrifuge 134 may be a microfluidic/continuous centrifuge which separates the media and the cells to remove toxins. In situ flow cytometry may be performed to allow for determination of cell density and cell viability. One or more cameras or other sensors may be positioned along the fluid path to observe properties of the fluid or the cells.

FIG. 7 illustrates a pump fluidly connected to one or more of the bioreactors which may be used for re-circulating fluid. As previously explained, the pump 132 may be used to recirculate the fluid media to a centrifuge. Ports for the bioreactors may be self-sealing so that they need not be used. One can also move connections so as to include additional reactors as the system expands. Thus, any of a number of combination of inlets and outlets may be used for a recirculation loop.

As used herein the term "gate" is intended to include any structure which may be used to prevent or block flow of fluid. For example, a valve is one example of a gate as it may be used to selectively allow or prevent or block flow of fluid.

The invention is not to be limited to the particular embodiments described herein. In particular, the invention contemplates numerous variations in the number of bioreactors, the configuration of bioreactors, the sensors used, the type of reactions being controlled, and other variations. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:
1. A bioreactor system having an expanding volume comprising:
    a bioreactor assembly comprising a plurality of bioreactors including at least a first bioreactor and a second bioreactor proximate the first bioreactor wherein each of the plurality of bioreactors comprises at least one fluid input port and at least one fluid output port;
    a first gate between the first bioreactor and the second bioreactor, the first gate separate from the at least one fluid input port and the at least one fluid output port of each of the plurality of bioreactors wherein in a first configuration the first gate is closed forming a shared wall between the first bioreactor and the second bioreactor and the first bioreactor is isolated from the second bioreactor and in a second configuration the first gate is open and the first bioreactor is contiguous with the second bioreactor and media and cells form a homogenous mixture within a combined volume formed by the first bioreactor in combination with the second bioreactor.

2. The bioreactor system of claim 1 further comprising a microdispenser for each of the plurality of bioreactors.

3. The bioreactor system of claim 1 wherein the plurality of bioreactors further includes a third bioreactor proximate the second bioreactor and a second gate between the second bioreactor and the third bioreactor.

4. The bioreactor system of claim 1 further comprising a pH sensor for each of the plurality of bioreactors positioned to detect pH of fluid.

5. The bioreactor system of claim 1 further comprising at least one gas sensor for each of the plurality of bioreactors positioned to detect gas level within a corresponding one of the plurality of bioreactors.

6. The bioreactor system of claim 5 wherein the at least one gas sensor comprises a dissolved oxygen sensor.

7. The bioreactor system of claim 1 further comprising at least one light source and detector configured for cell observation.

8. The bioreactor system of claim 1 further comprising at least one light source and detector configured for cell counting.

9. The bioreactor system of claim 1 further comprising at least one light source and detector configured to observe changes within the media.

10. The bioreactor system of claim 1 further comprising a control system for each of the plurality of bioreactors within the bioreactor system.

11. The bioreactor system of claim 10 wherein the control system provides real-time feedback from a plurality of sensor inputs for each of the plurality of bioreactors and provides actuation of one or more actuators.

12. The bioreactor system of claim 1 wherein each of the plurality of bioreactors includes an agitator.

13. The bioreactor system of claim 1 further comprising a centrifuge operatively connected to at least one of the plurality of bioreactors.

14. The bioreactor system of claim 1 further comprising a pump operatively connected to at least one of the plurality of bioreactors.

\* \* \* \* \*